US006783070B2

(12) United States Patent
Faria et al.

(10) Patent No.: US 6,783,070 B2
(45) Date of Patent: Aug. 31, 2004

(54) SCANEZE CHECK-IN-CHECK-OUT LIBRARY WORKSTATION

(76) Inventors: Ronald L. Faria, 1540 Pine Crest Dr., Grants Pass, OR (US) 97526; Christine A. Reames, 1540 Pine Crest Dr., Grants Pass, OR (US) 97526

(*) Notice: Subject to any disclaimer, the term of this patent is extended or adjusted under 35 U.S.C. 154(b) by 350 days.

(21) Appl. No.: 09/752,236

(22) Filed: Jan. 2, 2001

(65) Prior Publication Data

US 2002/0084899 A1 Jul. 4, 2002

(51) Int. Cl.[7] .................................................. G06K 7/10

(52) U.S. Cl. .................. 235/462.13; 235/449; 235/450

(58) Field of Search ............................ 235/462.13, 449, 235/450; 340/551, 572.1, 572.3; 336/118, 119, 221, 234; 234/462.13, 449, 450

(56) References Cited

U.S. PATENT DOCUMENTS 3,874,586 A * 4/1975 Foote et al. ............. 235/61.11
4,499,444 A 2/1985 Heltenes et al.
4,658,241 A * 4/1987 Torre .......................... 340/551
4,689,590 A 8/1987 Heltenes et al.
5,059,951 A * 10/1991 Kaltner .................... 340/572.3
5,210,524 A 5/1993 Schwarz et al.
5,587,703 A * 12/1996 Dumont ................... 340/568.2
5,594,228 A * 1/1997 Swartz et al. ............... 235/383
5,625,339 A 4/1997 Zarembo et al.
5,777,884 A * 7/1998 Belka et al. ................ 700/225
5,804,959 A * 9/1998 Nakagawa et al. ......... 323/355
5,805,065 A 9/1998 Schwarz et al.
6,057,763 A 5/2000 Brace et al.
6,060,988 A 5/2000 Copeland et al.
6,169,483 B1 * 1/2001 Ghaffari et al. .......... 340/572.3
6,173,897 B1 * 1/2001 Halpern ...................... 235/488

* cited by examiner

*Primary Examiner*—Michael G. Lee
*Assistant Examiner*—Kimberly Nguyen
(74) *Attorney, Agent, or Firm*—William W. Burns, Esq.

(57) ABSTRACT

A device for the sensitization/desensitization of magnetic security strips/EAS markers, the device comprising an electromagnetic transducer that operates alternately on AC/DC power to provide a small zone of electromagnetic flux that will sensitize/desensitize such strips or markers without damage to videos, audios, other equipment and operators.

6 Claims, 7 Drawing Sheets

40

SCANEZE CHECK-IN-CHECK-OUT LIBRARY WORKSTATION

I. FIELD OF THE INVENTION

The present Invention relates generally to electronic article surveillance (EAS) and more specifically for a device that alternately activates and deactivates magnetic security strips or EAS markers adhered to books and videos. While the instant Invention will find its greatest usage in libraries or video lending stores, it also is envisioned to protect property from theft in any lending or merchandising operation.

More specifically, the present Invention named the Scaneze Check-In-Check-Out Library Workstation, incorporates desensitization/sensitization of magnetic security strips or EAS markers, and laser scanning of bar code labels into the same unit. The present Invention is directed to the transducer and control circuitry which can sensitize or desensitize magnetic security strips on books and videos. The transducer of the present Invention is comprised of a specially designed electromagnet, including a core and intensifier blocks or pole pieces which combine to focus the flux created by the electromagnet into a very small space.

II. DESCRIPTION OF THE RELATED ART

There are numerous Inventions that can sensitize or desensitize magnetic security strips or EAS markers that are attached to books or videos. The present Invention has been designed to overcome the shortcomings of many of those Inventions. The electromagnet or transducer of the present Invention operates on considerably lower power than prior Inventions. The lower power results in less heat and less electromagnetic output (range of 700 gauss) that is highly focused. The benefits of this design are many. A few benefits include:

1) Scaneze eliminates electromagnetic interference that can disrupt computer functions; ruin video cassettes, and floppy disks; and can even destroy electrical equipment.

2) The Scaneze desensitizes/sensitizes, does not overheat as other units with greater power input do. This results in no downtime and no danger to operators.

3) The Scaneze unit will operate in both directions, right to left and left to right, increasing the speed and ease of operation.

4) The lower power results in reduced operating costs.

The prior art that appears to be most closely related to the present Inventions includes:

A) U.S. Pat. No. 5,625,339 (Farembo, et al.) which discloses a desensitizer/resensitizer apparatus that includes a magnetic field generator for generating a marker status changing field. The magnetic field generator includes an offset core designed for operation without excessive heat buildup.

B) U.S. Pat. No. 4,689,590 (Heltenes) discloses a demagnetization apparatus for EAS systems which incorporates magnetic sections within a non magnetic housing. The apparatus presents a succession of fields of alternating polarity which rapidly decreases in intensity from the surface of the apparatus. The unit is able to demagnetize high coercive force elements of a marker brought close thereto.

C) U.S. Pat. No. 6,060,988 (Copeland, et al.) describes an apparatus to deactivate EAS markers. The Invention includes a uniform core of four (4) arms on each of which a respective coil is provided. The coils are energized and the EAS marker is deactivated by moving it through an alternating magnetic field to degauss a control element of the marker.

D) U.S. Pat. No. , 5,805,065 (Schwarze, et al.) describes an apparatus for deactivation or desensitization of magnetic security markers. The marker is first exposed to an interrogating field to determine if the marker is active or magnetized. If an active marker is detected, the marker is exposed to an incrementally increased deactivation field to pacify the markers. E) U.S. Pat. No. 6,057,763 (Brace, et al.) describes an apparatus for activating and deactivating an EAS marker carried by an article. The apparatus incorporates permanent magnets attached to a carriage that moves in translational movement past a marker attached to the spine of a book F) U.S. Pat. No. 4,499,444 (Heltemes, et al.) describes a desensitization apparatus for deactivating EAS markers. The apparatus consists of a permanent magnet assembly having an elongated magnet and having opposed major surfaces, presenting one magnetic polarity at one of the major surfaces, and the opposite polarity on the other surface. The external field produced by the magnet is concentrated in a gap extending the length of the magnet. The flux being sufficient to magnetize an EAS marker alternates a short distance from the gap and reportedly prerecorded materials are not affected.

The present Invention provides improvements which allows for sensitizing/ desensitizing magnetic security strips or EAS markers more quickly with less electro=magnetic interference and no destruction of audio and video tapes and other electronic equipment.

SUMMARY OF THE INVENTION

The general purpose of the present Invention, which will be described subsequently in greater detail is to provide an improved apparatus to desensitize or sensitize magnetic security strips or elements and EAS markers more quickly, Ergonomically, without the problems associated with existing apparatus, including, but not limited to destruction of video tapes, interference with electronic equipment, and over heating.

The present Invention is designed to desensitize/sensitize magnetic security strips and EAS markers. The unit is also designed to read bar code labels, however, the sensitizing/ desensitizing function is the subject of this Application. The apparatus of this Invention is basically a transducer, a device that accepts an input of energy in one form and produces an output in another form. The transducer is comprised of an electromagnet that is designed to convert electricity to electromagnetic energy which it focuses in a very small space. The transducer is contained in a nonmagnetic case. The case includes electronic circuitry which switches the power to the electromagnet from AC (sensitizing) to DC (desensitizing). The electromagnetic flux from the transducer is focused between a pair of intensifier blocks or pole pieces through the case wall into the magnetic security strips or EAS markers. The controlled magnetic field of the transducer is limited (in the range of 700 gauss) and has a range of only two inches (2") so that it will not harm video tapes.

There has thus been outlined, rather broadly, the important features of the present Invention in order that the detailed description thereof that follows may be better understood, and in order that the present contributions may be better appreciated. There are, of course, additional features of the Invention that will be described hereinafter plus other embodiments, all of which will form the subject matter of the Claims appended hereto. Those skilled in the art will appreciate that the concept, upon which this disclosure is based, may readily be utilized as a basis for designing other structures or apparatuses for carrying out the several purposes of the present Invention. It is important, therefore, that the Claims be regarded as including such equivalent construction so far as they do not depart from the spirit and scope of the present Invention.

As such, it is an object of the present Invention to provide a new and improved apparatus to desensitize or sensitize magnetic security strips or EAS markers or their equivalent which has all of the advantages of the prior art apparatuses and none of the disadvantages of that prior art.

It is another object of this present Invention to provide a new and improved apparatus to desensitize or sensitize magnetic security strips, EAS markers, or their equivalent which may be efficiently and easily manufactured and marketed, and installed, and the components of which are easily contained and transported to the far corners of the world.

It is a further object of the present Invention to provide a new and improved apparatus to desensitize or sensitize magnetic security strips, EAS markers or their equivalent that may be simply, efficiently, reliably, and economically assembled with limited labor expense. And that is ergonomic reducing repetitive stress injuries including carpel tunnel syndrome.

An even further object of the present Invention is to overcome some of the disadvantages of prior art apparatus.

As a still further object of the present Invention, there is provided both an apparatus and method for desensitizing/sensitizing EAS or magnetic surveillance strips with left to right or right to left motion by a transducer which focuses magnetic flex into a very limited area in order to protect video tapes, audio tapes and other objects that may be harmed by strong electromagnetic fields.

These together with other objects of the Invention, along with the various features of novelty which characterize the Invention, are pointed out with particularity in the Claims annexed to and forming a part of this disclosure. For a better understanding of the Invention, its operating advantages, and the specific objects attained by its uses, reference should be had to the accompanying drawings and descriptive matter in which there is illustrated preferred embodiments of the Invention.

DESCRIPTION OF THE PREFERRED EMBODIMENT

Figure 1:
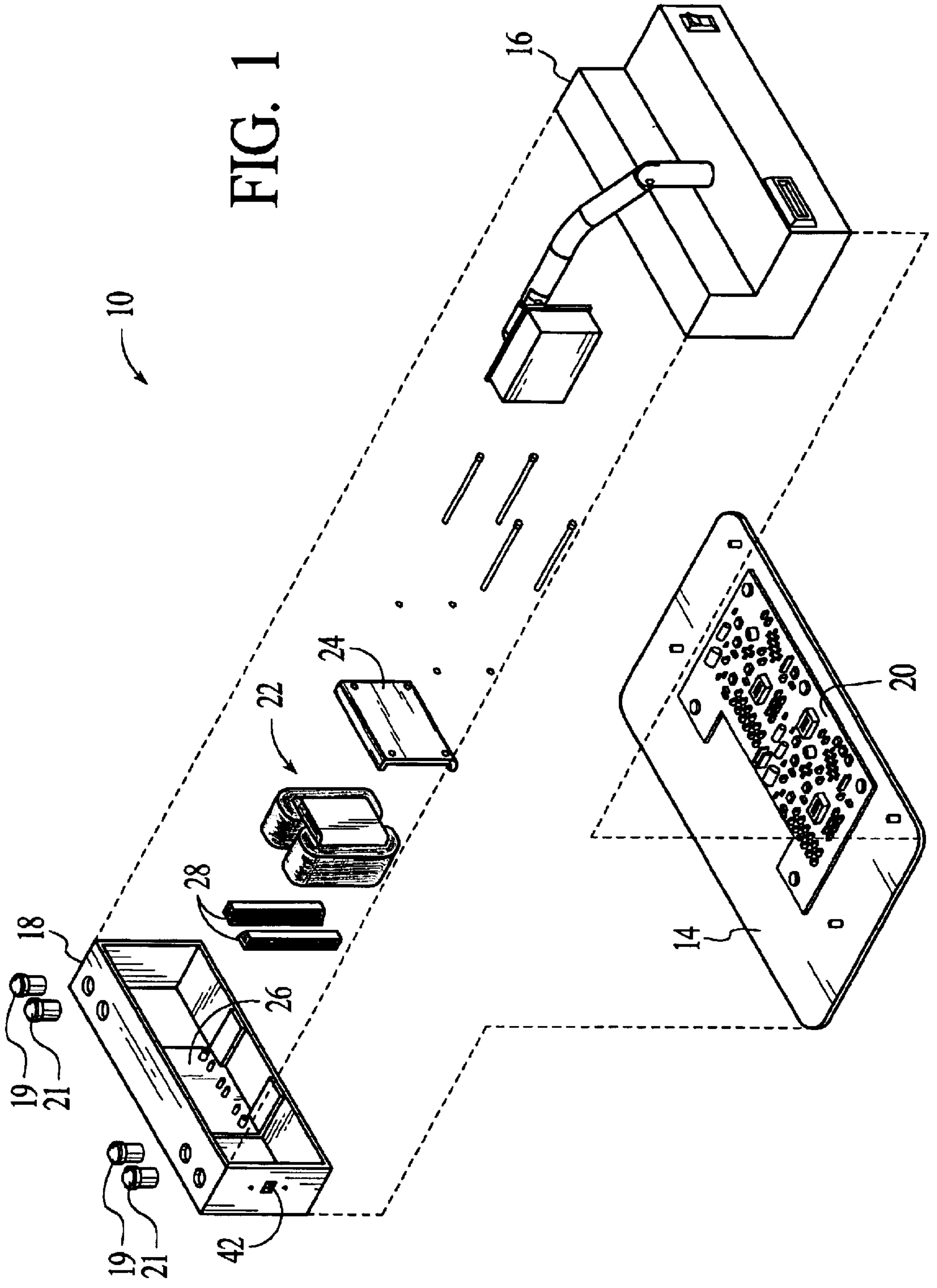
FIG. 1 presents an exploded perspective view of the apparatus of the present Invention constructed in accordance with the teachings of the present Invention.
Figure 2:
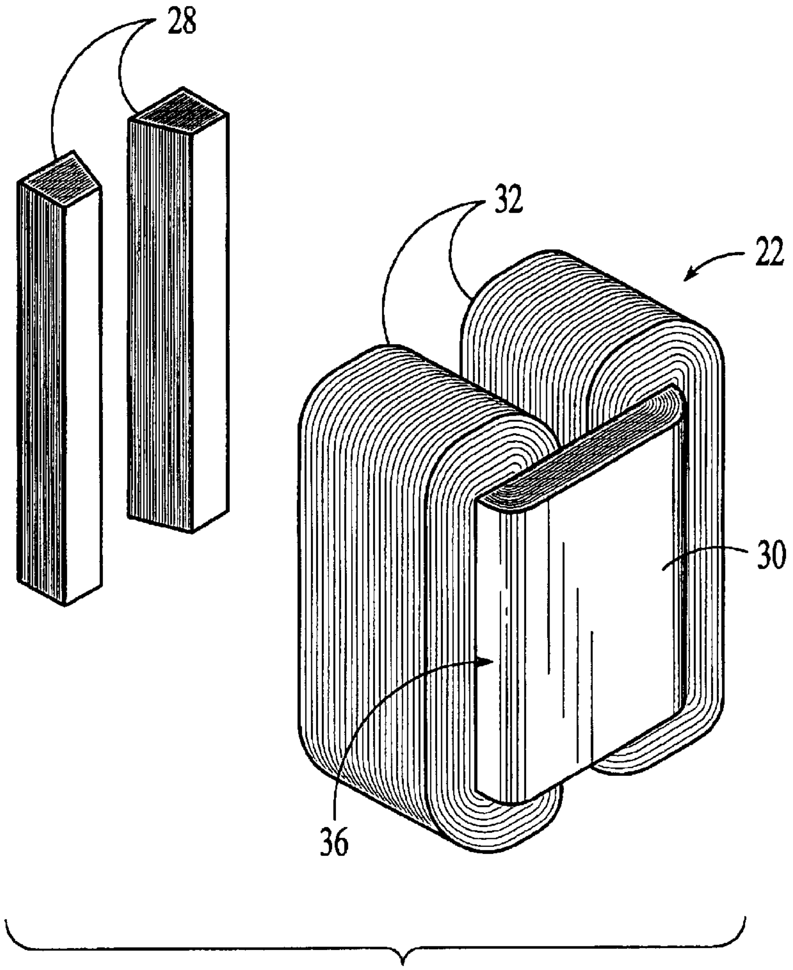
FIG. 2 presents a perspective view of the electromagnet and intensifier blocks of the present Invention.

The present Invention presents in its preferred embodiment a library workstation 10 for checking in and checking out books, videotapes, audio tapes, and other library materials. The workstation of the present Invention incorporates means for activating/deactivating security markers attached to books by electromagnetic transducer means and a laser scanner that reads bar code labels. In the preferred embodiment which is depicted in FIG. 1, the present Invention is contained in a housing 12. The housing 12 consists of a base 14, the cover 16, and the magnet housing 18. The cover 16 and the housing 18 are formed of stainless steel. The base is formed of one-eighth inch thick aluminum. The housing 12 is held together by an appropriate number of flat head screws that are fitted through openings in flanges in the cover 16 and housing 18 into threaded openings in the base 14. Overlying the base 14 is a PC Board 20 which rests upon three-eighth inch standoffs which are inserted into holes in the upper surface of the base 14.

The crux of this Invention is the specially designed electromagnet transducer 22 a which is securely installed in the magnet housing 18 by the combination of a rear magnet cover bracket 24 and the magnet bracket 26. The brackets are held in place by four (4) stainless steel pan head, Phillips screws which extend through the corners of the cover bracket 24 and into threaded openings in the bracket 26.

A pair of intensifier blocks 28 (FIGURE) are held securely in place forward of the magnet 22 by a series of pins that extend from the cover bracket 26. The two (2) intensifier blocks or pole pieces or means for flux intensification 28 form a channel which focuses the flux created by the magnet assembly 22.

Figure 3:
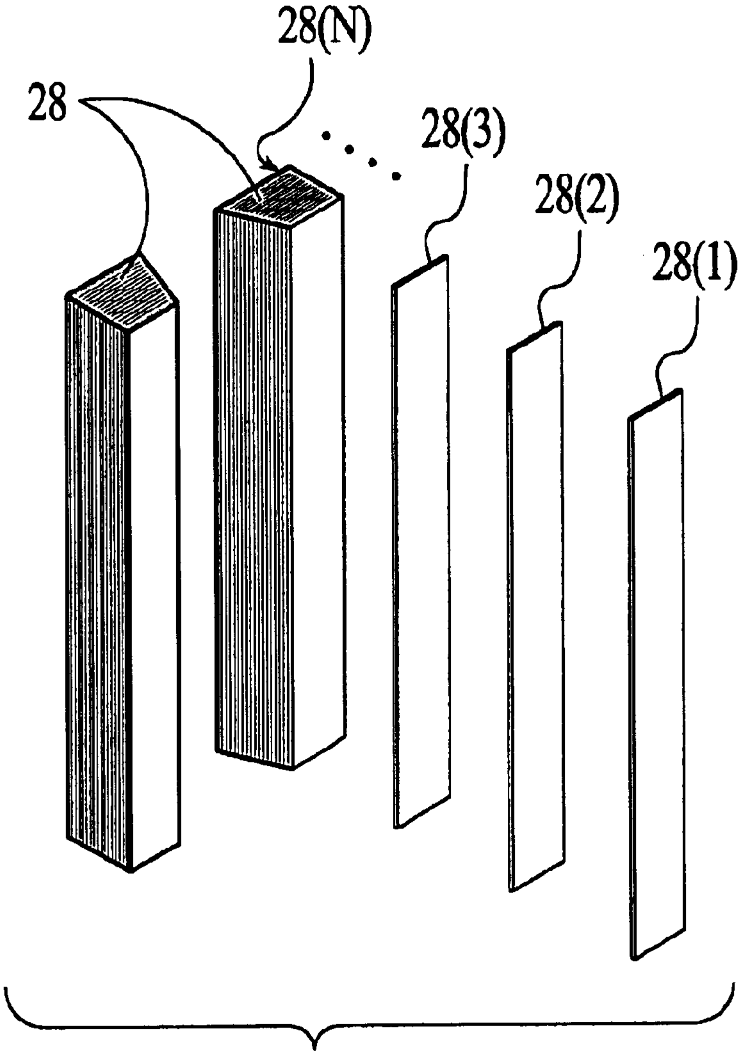
FIG. 3 presents an exploded perspective view of the intensifier blocks with several of the 0.12" laminated sheets peeled away.

The electromagnet 22 is comprised of the core 30 and two (2) electromagnetic coils 32. The coils are equal in size. Each coil includes a rectangular central slot 34 into which the legs 36 of the core 30 fits. Each of the coils is manufactured of concentrically wound wire. The core is also a laminated product formed of 36 sheets (0.012" thick) of 3% grain oriented silicon sulfide transformer steel. The grain of the legs 36 parallels the walls of the slot 34. The coils are wound such that the wire is wound perpendicular to the grain of the legs 36. The intensifier blocks (FIG. 3) are formed by the lamination of 32 sheets of 14 mil transformer steel. The cross-section of the intensifier blocks or intensifier block means 28 is that of a half-trapezoid. The grain is oriented parallel to the wide side of the half-trapezoid. The blocks 28 are 3.85 inches in length which is the same height as the coils 22. The grain of the blocks 28 in the installed condition is perpendicular to the grain of the legs 36 of the core 30.

Figure 4:
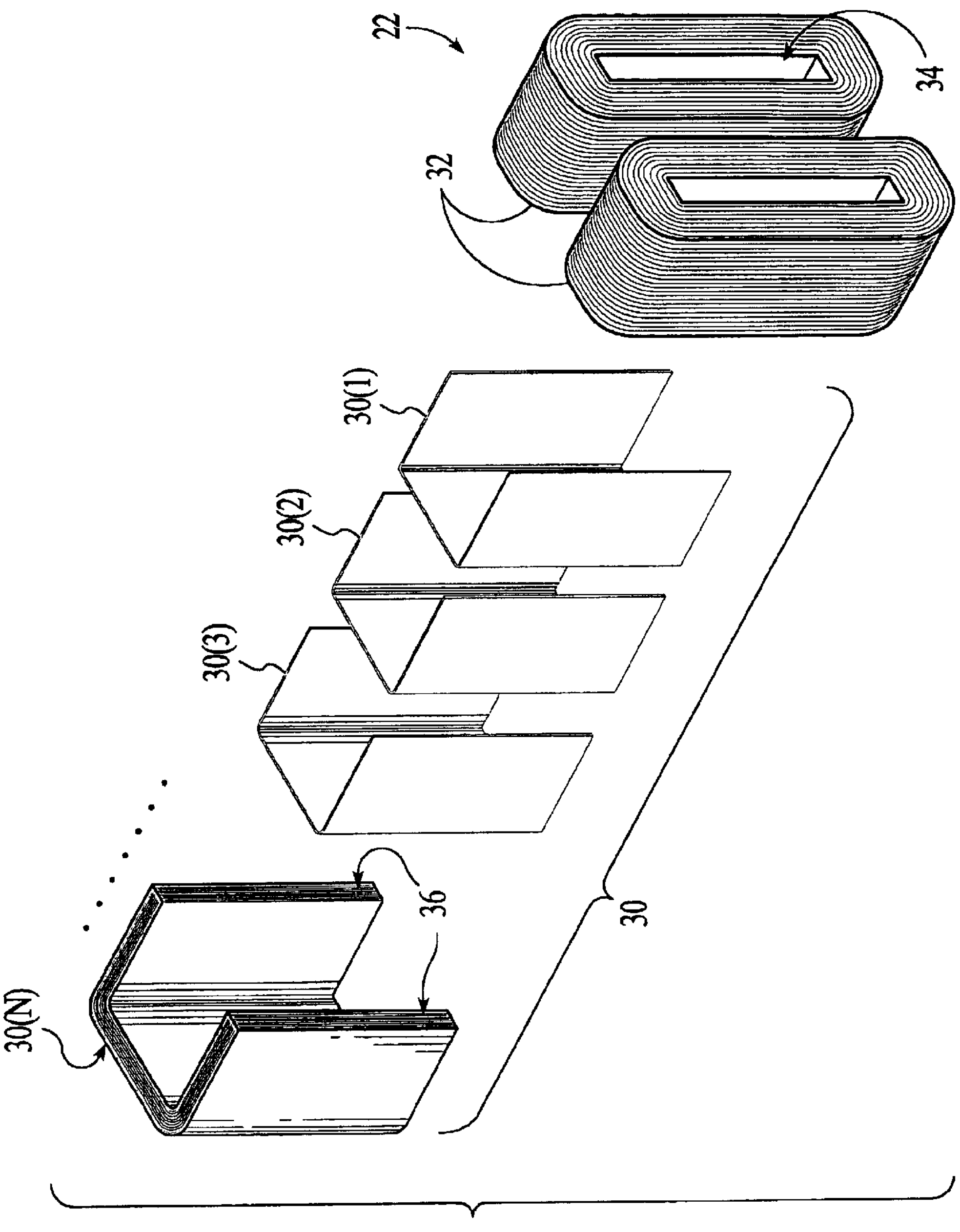
FIG. 4 presents a perspective view of electromagnet of FIG. 2 viewed rotated 180 degrees with parts removed and exploded to display the 0.012" sheets that are laminated into the core.
Figure 5:
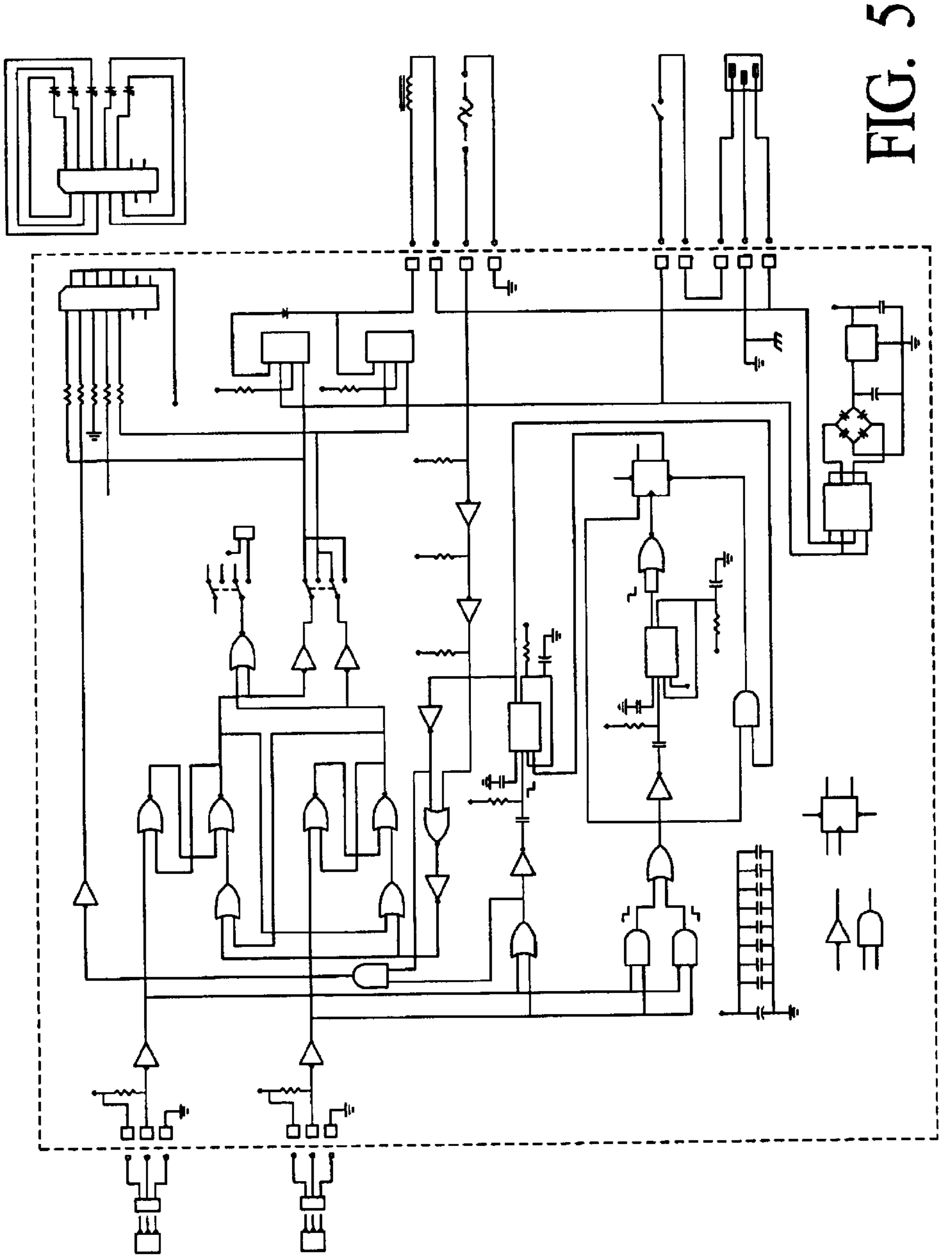
FIG. 5 illustrates the electronic circuitry of the present Invention.

The electronic circuitry means 40 for the check-in, checkout workstation 10 is shown in FIG. 4. The workstation incorporates desensitization and sensitization of electronic article surveillance (EAS) markers along with a laser scanner 41 to read bar code labels. The emphasis in this application is upon the Invention for desensitization/sensitization of magnetic security strips or EAS markers in books and videos. In FIG. 5, the circuitry 40 applicable to the desensitization/sensitization Invention has been simplified to more fully illustrate the function of the circuitry. The circuitry is designed to operate the electromagnetic transducer under low power and low electromagnetic force. The workstation of the preferred embodiment operates on standard 110/120 line current. The circuitry includes an AC Transformer to convert the AC to DC current. The transducer sensitizes EAS markers when powered by AC current and desensitizes EAS markers when powered by DC current. The circuitry incorporates a magnetic field switch 42 to shift between sensitization (AC current) and desensitization (DC current).

Figure 6:
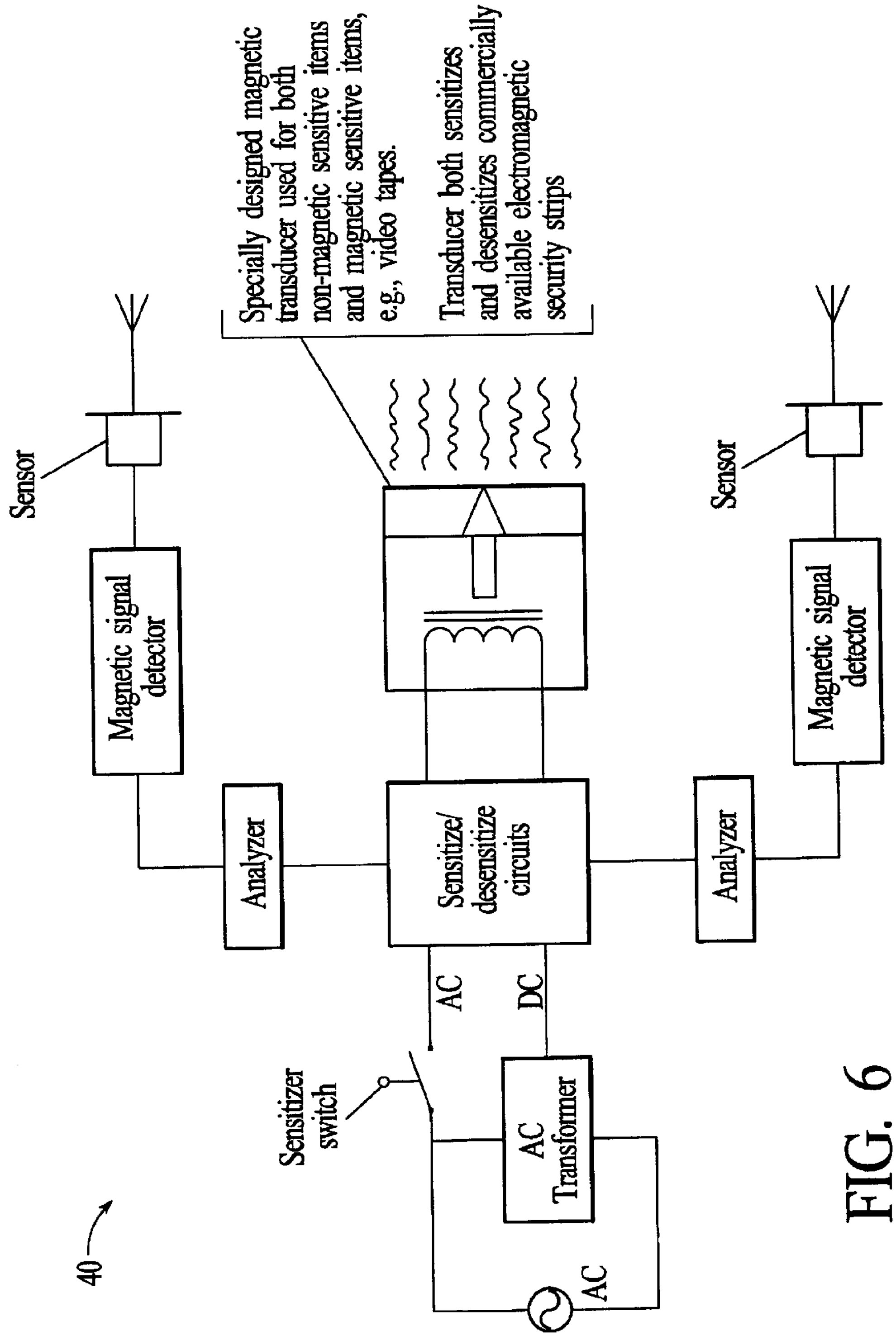
FIG. 6 presents the electronic circuitry of the present Invention in simplified block diagram format.
Figure 7:
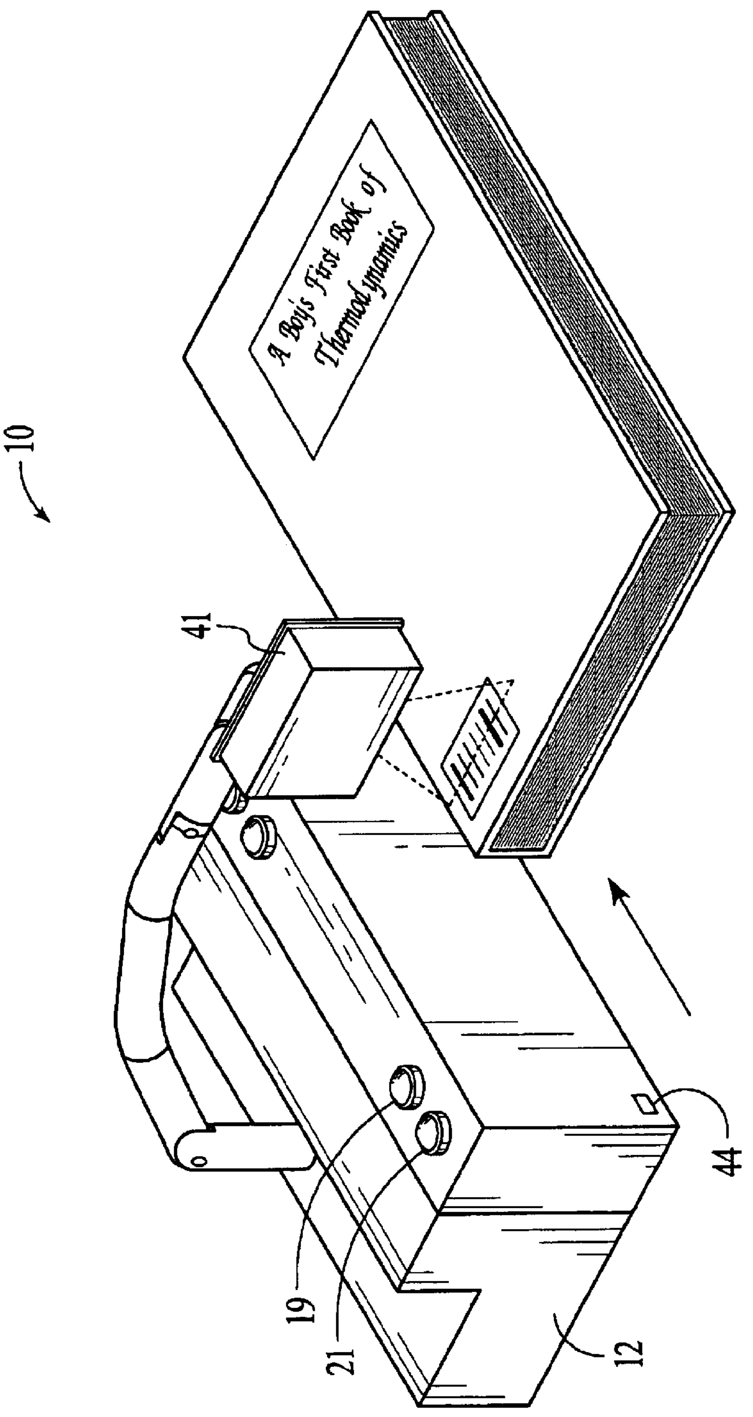
FIG. 7 presents a perspective view of the present Invention as it is used to check in/check out a book.

The Scaneze workstation is capable of being used for "front-to-back" or "back-to-front" book movement by changing the position of the switch means 42. With the magnetic field switch in the UP position, the unit will sensitize from left to Right and desensitize from right to left. Moving the magnetic field switch to the DOWN position will reverse the function In operation, the spine of a book or tape (FIG. 6) having an EAS marker applied thereon is held in contact with the face 17 of the cover 16 as an operator slides the book or tape along to sensitize or desensitize the EAS marker, as the book or tape slides against the FACE 17, the focused magnetic field created by the transducer extends only two (2) inches outward from the face 17.

Sliding an item (book or video with a magnetic security strip) in one direction desensitizes it, sliding the item in the opposite direction will resensitize it making the item ready to put back on the self. The magnetic field switch 40 when pushed, reverses the polarity of the magnetic field. The Scaneze unit will allow you to desensitize or resensitize both books and videos, without making changes to the unit, due to the controlled magnetic field. This is done by a formula designed into the magnetic core and pole pieces, with a specific designed coil system, as well as board design. This produces a gauss (in the range of 700 gauss) strong enough to only desensitize or resensitize security strips or EAS markers in books or videos, with a magnetic field distance of only 2". The board also consists of filtering components which eliminate the magnetic forces that reverse back into the main power system.

To help the operator, a series of green and red lights are placed on the upper surface of the housing 12. The green lights 19 indicate either desensitize or sensitize. Red lights 21 indicate pause/fail. If a book or video does not move across the face 17 within 3 seconds, the pause light will come on, and the machine will automatically shut down. To restart the machine, the operator simply moves the book or video away and rescans.

At the opposite ends of face 17, are the magnetic signal detectors or activator sensors 44. The sensors signal the presence of the magnetic security strip or EAS marker in the zone of the face 17. The sensors 44 placed at each end allow the unit 10 to desensitize/sensitize magnetic security strips/EAS makers if a book or tape is pushed from either direction, left to right or right to left.

While the Invention has been described with references to the specific embodiments described, those descriptions are only illustrative and are not to be construed as limiting the Invention. With respect to the above descriptions, then, it is to be realized that the optional dimensional relationships for the parts of the Invention include variations in size, materials, shape, configuration, form, function, power, energy and manner of operations assembly and use, are deemed readily apparent and obvious to those skilled in the art and all equivalent relationships to those illustrated in the drawings and described in the specifications are intended to be encompassed by the present Invention.

Therefore, the foregoing is considered as illustrative only of the principles of the Invention. Further, since numerous modifications and changes will readily occur to those skilled in the art, it is not desired to limit the Invention to the exact construction and operation shown and described and accordingly, all suitable modifications and equivalents of apparatus and method may be resorted to by falling within the scope of the Invention.

What is claimed as being new and desired to be protected by Letters Patent of the United States is as follows:

1. A device for desensitization or sensitization of magnetic security markers, such as those used on books or videos, comprising:

a) an electromagnetic transducer including a magnet comprised of a core and coil of concentrically wound wire, intensifier blocks forward of the magnet to focus the flux of the magnet, said core being comprised of laminated sheets of transformer steel, and said intensifier blocks being comprised of laminated layers of transformer steel;

b) electronic means to power said electromagnetic transducer with DC or AC current; and c) switch means to shift the power to the transducer means between AC and DC, such that when said electromagnetic transducer is powered by DC current it will desensitize magnetic security markers that are moved past said transducer, and when said electromagnetic transducer is powered by AC current it will sensitize magnetic security markers that are moved past said electromagnetic transducer;

wherein the core is comprised of 36 sheets of 0.012" thick 3% rain oriented silicon sulfide transformer steel that are laminated together;

wherein the intensifier blocks are comprised of 32 sheets of 14 mil transformer steel that are laminated together.

2. The device of claim 1, wherein said electromagnetic is comprised of two (2) electromagnetic coils and a core.

3. The device of claim 1, wherein a cross-section of the intensifier blocks is that of a half-trapezoid.

4. The device of claim 1, wherein the electromagnetic transducer produces a flux having a depth of 2 inches, a width equal to the width of the transducer and a flux density no greater than 700 gauss.

5. The method of desensitizing or sensitizing a magnetic security marker attached to books or videos by an electromagnetic transducer workstation comprising the steps of:

a) switching the power to the transducer to direct current;

b) emitting electromagnetic flux in a range of 2 inches or less, and of a maximum flux density of 700 gauss;

c) moving the marker in translational movement by the workstation and the transducer and its emitted flux to desensitize the marker, d) switching the power to the transducer to alternating current;

e) emitting electromagnetic flux in a range of 2 inches or less and of a maximum 700 gauss;

f) moving the marker in translational movement by the workstation and transducer to sensitize the marker wherein the desensitizing/sensitizing procedure is accomplished without damage to videos because of the short range and low flux/density.

6. An apparatus or workstation for desensitizing or sensitizing electromagnetic markers attached to books or videos comprising:

a) a housing comprised of a base, a cover, and a magnet housing;

b) an electromagnetic transducer secured to the base and the housing in position to emit electromagnetic flux through the wall of the magnetic housing, said electromagnetic transducer including a magnet, that is comprised of a core and two (2) coils of concentrically wound wire, and a pair of intensifier blocks, forward of the magnet, which focus the flux created by the magnet into a small space through said wall;

c) electronic circuitry to power the electromagnetic transducer with direct current or alternating current, d) switch means to shift the power to the electromagnetic transducer between AC and DC current such that, when said electromagnetic transducer is powered by DC current it will desensitize magnetic security markers that are moved past said housing and said transducer, and when said electromagnetic transducer is powered by AC current, it will sensitize magnetic security markers that are moved past said housing and electromagnetic transducers;

wherein the transducer produces a flux having a depth of 2 inches, width equal to the width of the transducer, and a flux density no greater than 700 gauss, wherein the desensitizing/sensitizing procedure is accomplished without damage to videos because of the short range and low flux density;

wherein the flux that is created by the magnet is focused between the intensifier blocks through the face of the housing into the magnetic security mark which moves translationally across the path of the flux.

* * * * *